United States Patent
Baumeister et al.

(10) Patent No.: US 6,981,046 B2
(45) Date of Patent: Dec. 27, 2005

(54) SYSTEM FOR THE EFFICIENT TRANSMISSION OF PARTIAL OBJECTS IN DISTRIBUTED DATA BASES

(75) Inventors: Markus Baumeister, Aachen (DE); Steffen Hauptmann, Aachen (DE); Karin Klabunde, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 772 days.

(21) Appl. No.: 09/908,197

(22) Filed: Jul. 18, 2001

(65) Prior Publication Data
US 2002/0029240 A1  Mar. 7, 2002

(30) Foreign Application Priority Data
Jul. 19, 2000  (DE) ................. 100 35 140

(51) Int. Cl.[7] .......................... G06F 13/00
(52) U.S. Cl. ............ 709/226; 709/203; 709/219; 709/225; 707/10
(58) Field of Search ............. 709/203, 217, 709/219, 223, 225, 226; 707/10, 104

(56) References Cited

U.S. PATENT DOCUMENTS

| | | | |
|---|---|---|---|
| 6,173,313 B1 * | 1/2001 | Klots et al. ................. | 709/203 |
| 6,327,591 B1 * | 12/2001 | Osborn et al. ................ | 707/10 |
| 6,374,252 B1 * | 4/2002 | Althoff et al. .............. | 707/102 |
| 6,505,191 B1 * | 1/2003 | Baclawski ...................... | 707/3 |

OTHER PUBLICATIONS

R. Steinmetz, "Kommunikation in Verteilten Systemen (KiVS)", 11th ITG/GI Conference, Darmstadt, Mar. 1999, p. 340-351.

* cited by examiner

Primary Examiner—Viet D. Vu

(57) ABSTRACT

The invention relates to a network having network nodes (1 to 5) and a software system distributed among all the network nodes (1 to 5), said software system having at each network node (1 to 5) a software component referred to as a distribution utility (12 to 14) for the access to the data of a distributed data base (31), and for the communication with other distribution utilities (12 to 14) of different network nodes. A software component referred to as a data manager (15 to 19) serves as a link from the data base (31) to other components and includes a callback component (20 to 24) for the access to at least one element (28) of a data object (29). With the aid of a key consisting of two parts, of which a first part is a distribution utility key (33) for the identification of a data object (29) by the distribution utility (12 to 14), and of which a second part is a data manager key (34) for the identification of at least one required element (28) of a data object (29), it is possible to access both the data object (29) and individual elements (28) of the data object (29).

2 Claims, 5 Drawing Sheets

SYSTEM FOR THE EFFICIENT TRANSMISSION OF PARTIAL OBJECTS IN DISTRIBUTED DATA BASES

TECHNICAL FIELD

The invention relates to a network having network nodes and having a software system distributed among all the network nodes.

BACKGROUND OF THE INVENTION

Such a network is known from Ralf Steinmetz (Editor): "Kommunikation in verteilten Systemen (KiVS)", $11^{th}$ ITG/GI Conference, Darmstadt, 2–5 Mar. 1999; Stephan Abramowski, Heribert Baldus, Tobias Helbig: "Digitale Netze in Wohnungen Unterhaltungselektronik im Umbruch", pages 340–351. Said publication describes requirements imposed on a future home network and the software used therein. It is not explained how an efficient transmission of individual elements of a data object during data access operations in distributed data bases is realized in such a network with a distributed software system.

SUMMARY OF THE INVENTION

It is an object of the invention to provide a network with a software system, which makes it possible to realize an efficient transmission of data objects and of elements of a data object with a small number of data access operations within the constraints of limited memory and processor resources.

This object is achieved with a network of the type defined in the opening paragraph in that the distributed software system includes at each network node a software component referred to as a distribution utility for the access to the data of a distributed data base, and for the communication with other distribution utilities of different network nodes, and at least one software component referred to as a data manager, which serves as a link from the data base to other components and which includes a callback component for the access to at least one element of a data object, and a key consisting of two parts, of which a first part is a distribution utility key for the identification of a data object by the distribution utility, and of which a second part is a data manager key for the identification of at least one required element of a data object.

In the network having a plurality of network nodes and a software system distributed among all the network nodes the required functionality of an efficient distributed data base is divided between two components.

The tasks (for example replication, consistency of the data) relating to the data distribution are resolved by a software component which is referred to as distribution utility and which is available once at each network node. The distribution utility provides the access to the data of the distributed data base and the communication with other distribution utilities of different network nodes.

The second software component is a data manager, which provides a link from the data base to other components, as for example a user application. The data manager is used by the distribution utility via a callback component for the interpretation of the data which are not structured for the distribution utility. It processes the data into a format that is comprehensible by the distribution utility. Several data managers may be present at each network node.

Data access often takes place both to complete data objects (for example a preference editor, which graphically represents all the user preferences) and to individual elements (for example an application that requires only one or a few user preferences). A two-part key enables both a complete data object and a single element of a data object to be identified. On the one hand, the key comprises a distribution utility key, with the aid of which the distribution utility locates the required data object within the distributed data base. On the other hand, each data manager can specify, with the aid of a data manager key, which element of a data object is to be accessed. With the aid of the data manager key applied to it the data manager can extract the desired element from the data object and transfer it to the distribution utility of the same network node. The distribution utility transfers the element to the distribution utility of the inquiring data manager, which has supplied the data manager key.

Since the data manager key can be generated and evaluated by data managers having the same functionality the syntax and the content of the data manager key can be defined specifically for the respective data manager and can thus be adapted to the data structure managed by this data manager. If the data manager does not supply a key the distribution utility will send back the complete data object identified by the distribution utility key. This data object is then either transferred directly to the user application by the data manager or it is first parsed into its elements by the callback component in the data manager. As a result of this, many individual access operations to elements stored at remote network nodes can be replaced by one access to the data object including the desired element.

If a network node fails as a result of a fault, the distribution utility is informed so as to allow this utility to adapt, for example, the replication of the data accordingly. When a new network node is added the distribution utility performs the integration of the network node and the update of its data in the network. In order to carry out these and other tasks the distribution utility utilizes the services and information of the callback components of the various data managers. The services and information may include, for example, reading of elements of a data object, writing of elements of a data object, merging of two versions of a data object and information about the desired replication of a data object.

The local memory manager is in charge of the management of the data base of the network node. The distribution utility requests the local memory manager to change its data base.

BRIEF DESCRIPTION OF THE DRAWINGS

An embodiment of the invention will be described in more detail, by way of example, with reference to the drawings. In the drawings.

DETAILED DESCRIPTION

Figure 1:
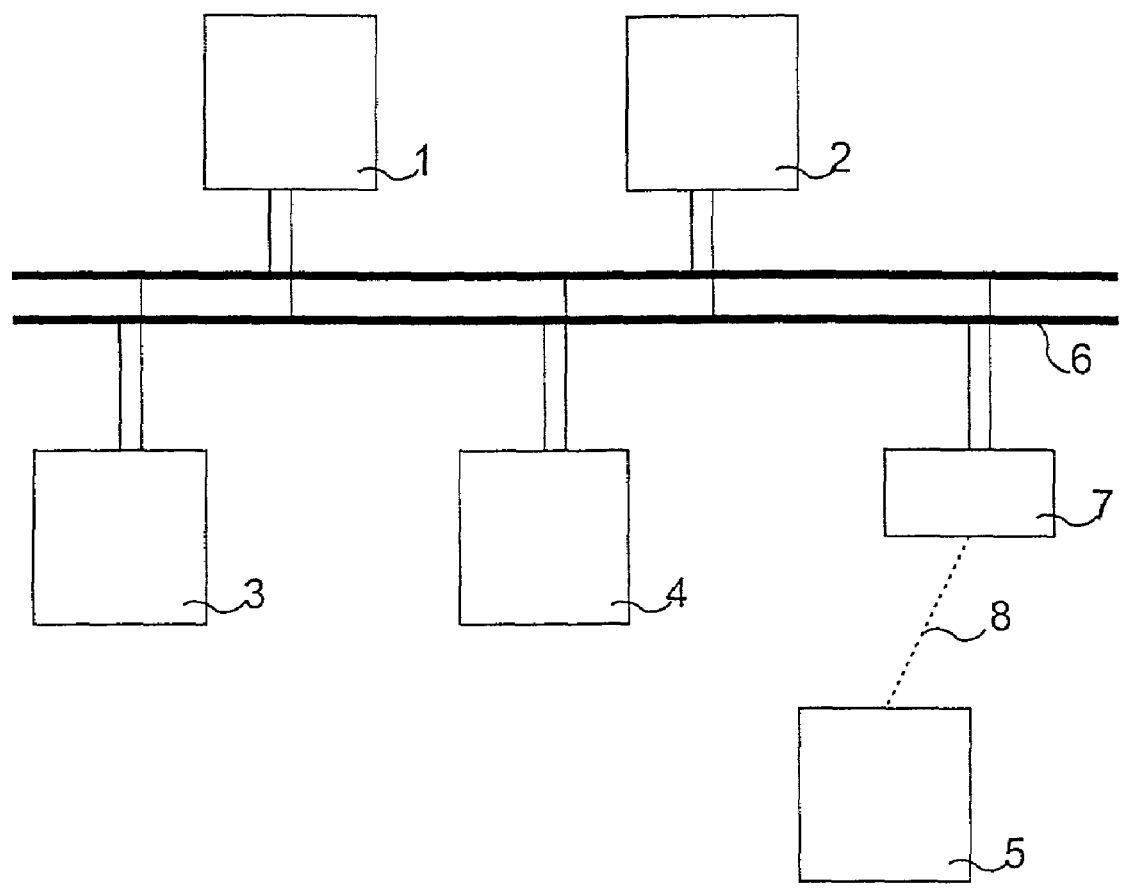
FIG. 1 shows a network with a plurality of network nodes.

FIG. 1 shows a network that couples different network nodes 1 to 5 to one another via a bus system 6. The network nodes 1 to 5 may alternatively be coupled to the bus system 6 via a wireless link 7 and a transmitting/receiving station 8. It is possible to use, for example, infrared, ultrasound or radio links for this purpose. Such network nodes can be, for example, PCs and home-entertainment equipment, such as for example a TV set, a set-top box, a tuner, a camera, a digital video recorder, a CD player.

Figure 2:
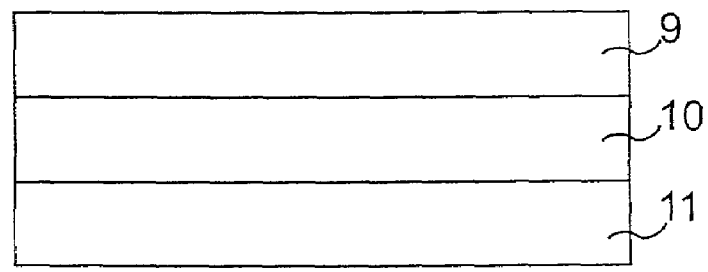
FIG. 2 shows different software layers of the software system used in the network, FIG. 3, by way of example, shows three network nodes with the software components.

FIG. 2 shows the software system, which consists of different software layers set up on the operating system. The uppermost software layer is an application layer 9. The next software layer is an infrastructure layer 10 and the lowermost software layer is a network layer 11.

Figure 3:
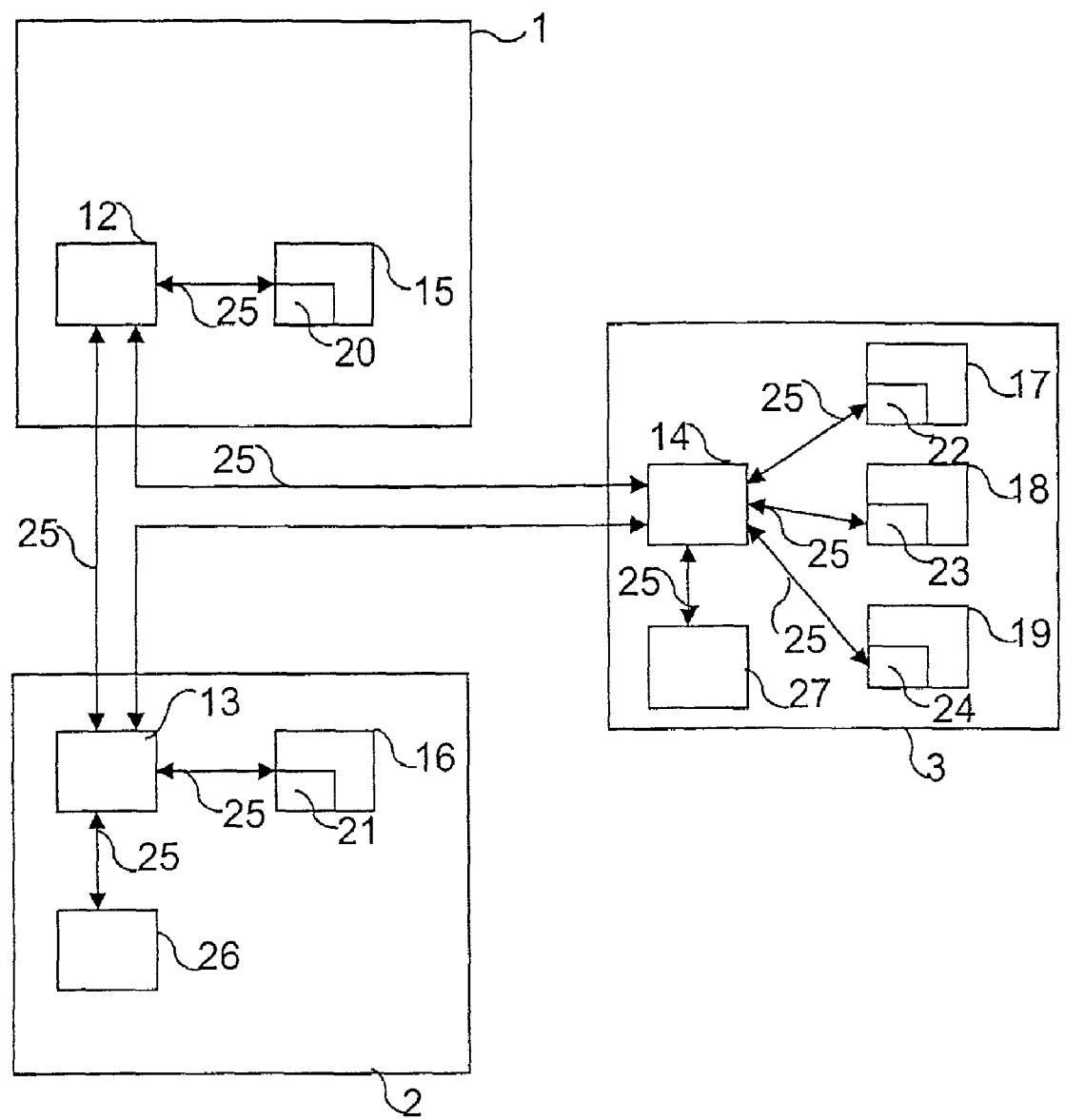

FIG. 3 shows an example of the distribution and cooperation of software components of the infrastructure layer 10. The software components of the infrastructure layer 10 for the infrastructure management of three network nodes 1 to 3 comprise a plurality of distribution utilities 12 to 14 and a plurality of data managers 15 to 19. Each of the data managers 15 to 19 includes a callback component 20 to 24. A callback component 20 to 24 serves for parsing a data object 29 consisting of a plurality of elements 28. The distribution utilities 12 to 14 perform all the tasks resulting from the distribution of the data, for example they replicate the data of the data base. The tasks necessary for the processing of the data for the application and tasks requiring knowledge of the interior structure of the data are performed by the respective data manager 15 to 19.

The distribution utilities 12 to 14 and at least one data manager 15 to 19 are located at each of the three network nodes 1 to 3. In the present example the data managers 15, 16 and 17 supply data structures which are available at each of the three nodes. The data structures supplied by the data managers 18 and 19 contain data which can be accessed only at the network node 3. Each data manager 15 to 19 includes a callback component 20 to 24. The callback components 20 to 24 and the distribution utilities 12 to 14 of each network node 1 to 5 communicate with one another by different method calls and callback (?) values. They are represented by the double arrows referenced 25 and hereinafter they are simply referred to as the method 25.

The data manager 15 to 19 registers itself at the respective local distribution utility 12 to 14 during the initialization of the software system and by means of the method 25 it informs for which data with which prefix of the key the callback component 20 to 24 renders the method 25 available. In addition, a local memory manager 26 and 27 may be situated at the network nodes 1 to 5 to manage the data stored at the network nodes 1 to 5. By means of the method 25 the local memory managers 26 and 27 communicate exclusively with the respective distribution utility 13 or 14 of its network node 1 to 3. If there is no local memory manager at the network node 1, the distribution utility 12 cannot access the local network node and should transfer all requests to the distribution utilities 13 and 14. The communication between the distribution utilities 12 to 14 of the individual network nodes 1 to 5 is effected by means of different methods 25.

Figure 4:
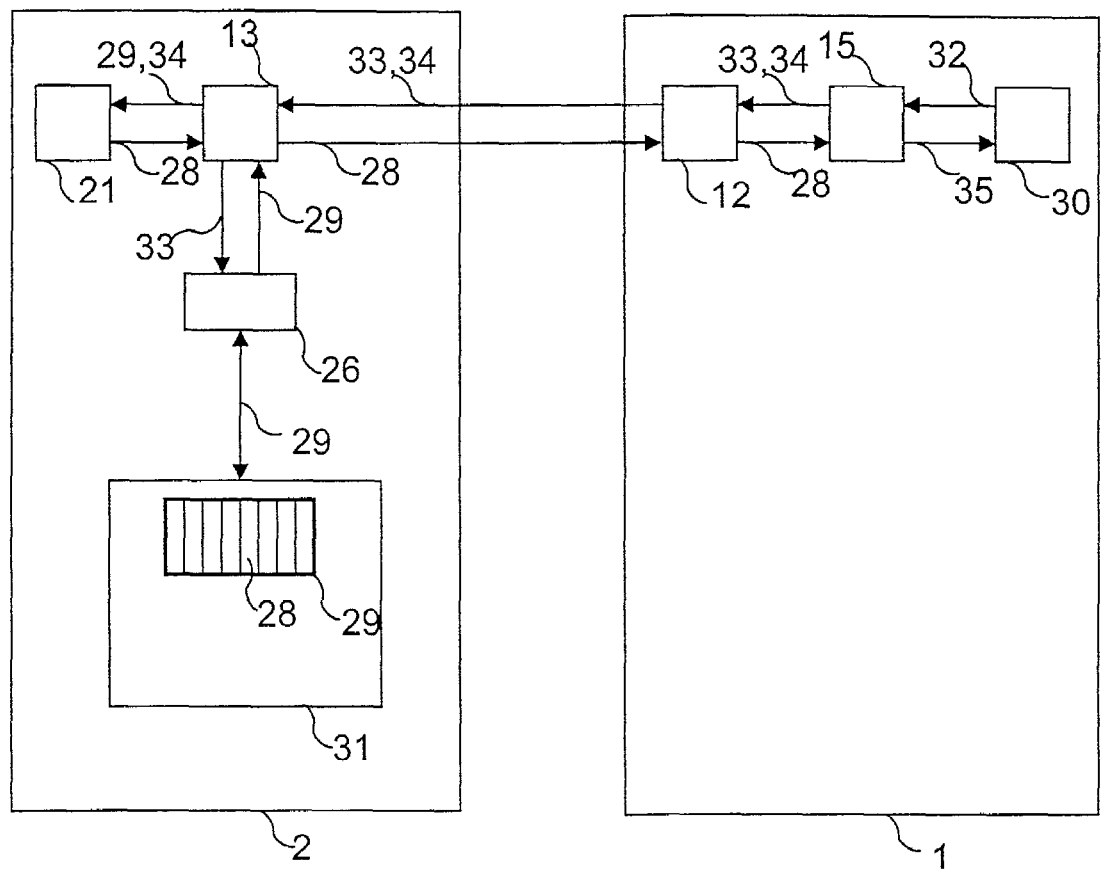
FIG. 4 is a basic functional representation of the access to an element of a data object at a local network node by a remote network node.

FIG. 4 illustrates the functional sequence while an application 30 started at the network node 1 is accessing an element 28 of a data object 29 stored at a remote network node 2. Here, the arrows shown in FIG. 4 each represent a method call or a method callback (?) with the transfer of the components identified with the aid of the reference symbols.

During the distribution of the data the data to be stored are received by the distribution utilities 12 to 14 as binary data objects 29, i.e. said distribution utilities know the size (length) of the data object 29 but have no knowledge about its structure (?). The data object 29 consists of a plurality of elements 28, which will not be described in more detail. After the user has started the application 30 the latter detects that an element 28 of a data object 29 present in a data base 31 at a remote location is needed. The application 30 sends a request 32 to the data manager 15. The application 30 may alternatively include the data manager 15 if it is the only one having access to the corresponding data. The data manager 15 derives from the request 32 the two keys with the aid of which it can obtain the desired element at the distribution utility 12, i.e. a distribution utility key (VU key) 33 and a data manager key (DM key) 34.

A VU key 33 is a sequence of bytes, which sequence serves for the identification of data objects 29. During storage the data objects 29 are stored in the network by the distribution utilities 12 to 14 with the aid of a VU key 33 each. The first two bytes of the VU key 33 indicate the associated callback component 20 to 24 for which the data are intended. This prefix precludes conflicts between the different callback components 20 to 24. The residual bytes are arbitrary. Two data objects 29 stored with the aid of the same VU key 33 are identical, i.e. they contain the same data.

The syntax of the DM key 34 is specific to the generating data manager 15 to 19 and, consequently, also to the callback component 20 to 24 to be evaluated. The DM key 34 may be idle or the data manager 15-19 employs said key as a parameter for accessing an element 28 of a data object 29, for example with the aid of the DM key an attribute instead of a complete object may be transmitted, an element of a field or a list may be accessed. The content of a DM key 34 is represented in the form of a sequence of bytes, for which reason the content of the DM key 34 may include not only the index of a field but also complete queries for the data object 29. Both the content and the syntax of the DM key 34 can be selected freely for the respective data manager 15 to 19.

With the aid of the VU key 33 the distribution utility 12 of the local network node 1 locates the data object 29 including the required element 28 at a remote network node 2. The query with the VU key 33 and the DM key 34 is transferred from the distribution utility 12 of the local network node 1 to the distribution utility 13 of the remote network node 2.

The remote distribution utility 13 reads the entire data object 29 from the data base 31 with the aid of the VU key 33 via the local memory manager 26. When at this network node 2 a callback component 21 associated with the DM key 34 is available, the data object 29 is passed with DM key 34 to the callback component 21 by the distribution utility 13. With the aid of the DM key 34 the callback component 21 identifies the required element within the data object 29, as a result of which only the element 28 instead of the entire data object 29 can be transferred to the distribution utility 13 and then to the distribution utility 12 of the local network node 1.

The structure and the content of the data object 29 are then invisible to the distribution utilities 12 to 14. If the distribution utility 13 of the remote network node 2 has not found an appropriate callback component 21 or no DM key 34 has been transferred to this utility the distribution utility 13 will send the entire data object 29 to the distribution utility 12 of the local network node 1. The distribution utility 12 will then have the possibility to evaluate the DM key 34 with the aid of the callback component 20 in order to identify the required element 28. After the distribution utility 12 has transferred the element 28 to the data manager 15 the data manager 15 can reply to the application 30 with appropriate information 35.

Figure 5:
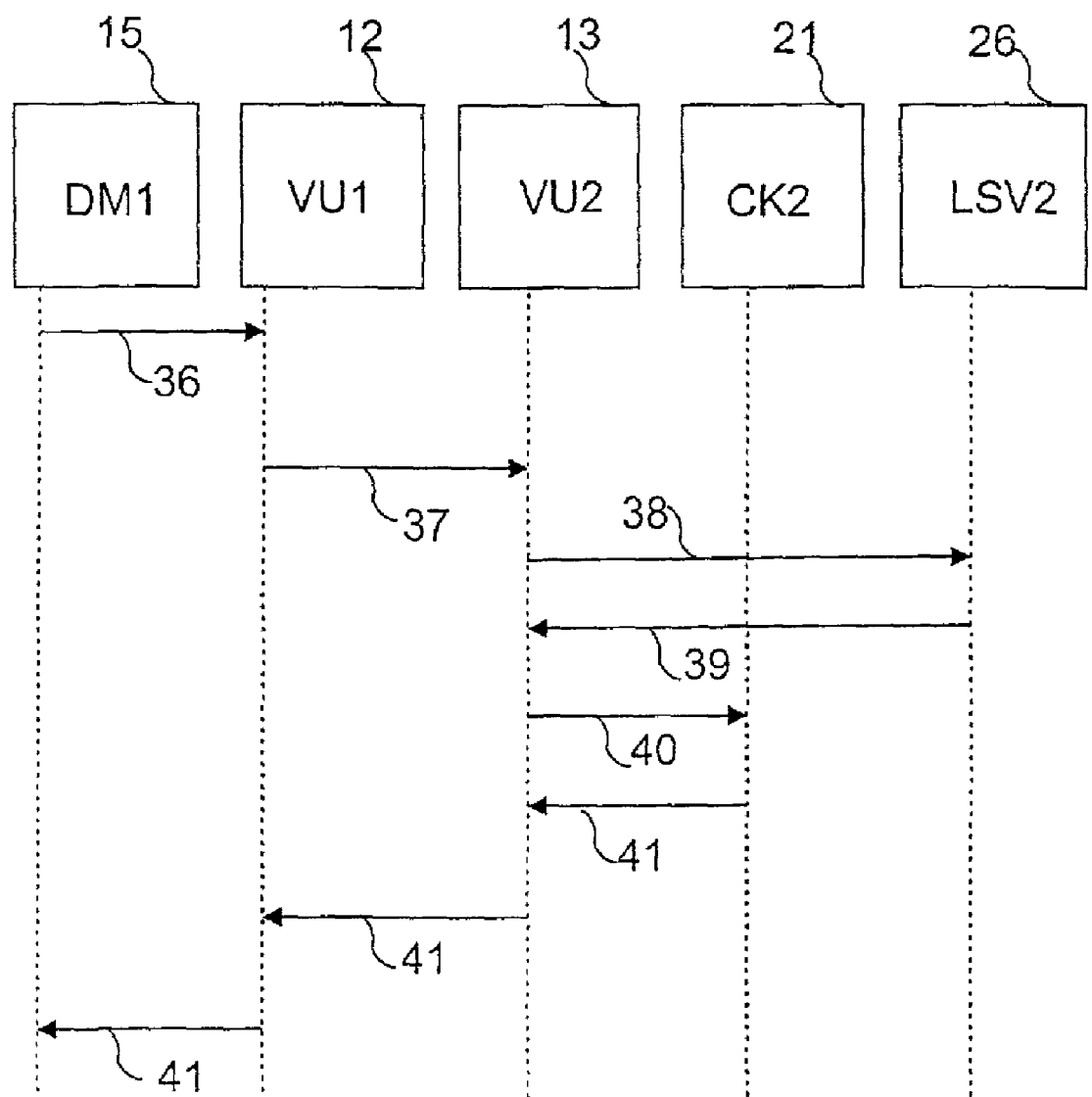
FIG. 5 is a signal flow chart representing the time sequence of actions during a read operation.

FIG. 5 illustrates the time sequence of the actions during a read operation. The application 30 requests information from the data manager 15 (DM1) of the local network node 1. In response thereto, the data manager 15 sends a request 36 with the VU key 33 and the DM key 34 to the distribution utility 12 (VU1) of the local network node 1. With the aid of the VU key 33 applied to it the distribution utility 12 locates the data object 29 at a remote network node 2, where the element 28 to be read is stored, and by means of a request 37 it request this element 28 from the distribution utility (VU2) 13 of the remote network node 2. The distribution utility 13 sends a request 38 with the VU key 33 to its local memory manager (LSV2) 26. The local memory manager 26 transfers the corresponding data object 29, which includes the requested element 28, to the distribution utility 13 in a reply 39. The distribution utility 13 completes this reply with the DM key 34 and submits a request 40 to the callback component (CK2) 21 of the data manager 12. This callback component 21 evaluates the DM key 34 and extracts the required element 28 from the data object 29. The element 28 is transferred from the callback component 21 to the distribution utility 13 in a reply 41. The distribution utility 13 sends the reply 41 to the data manager 15 of the local network node 1 via the distribution utility 12.

Figure 6:
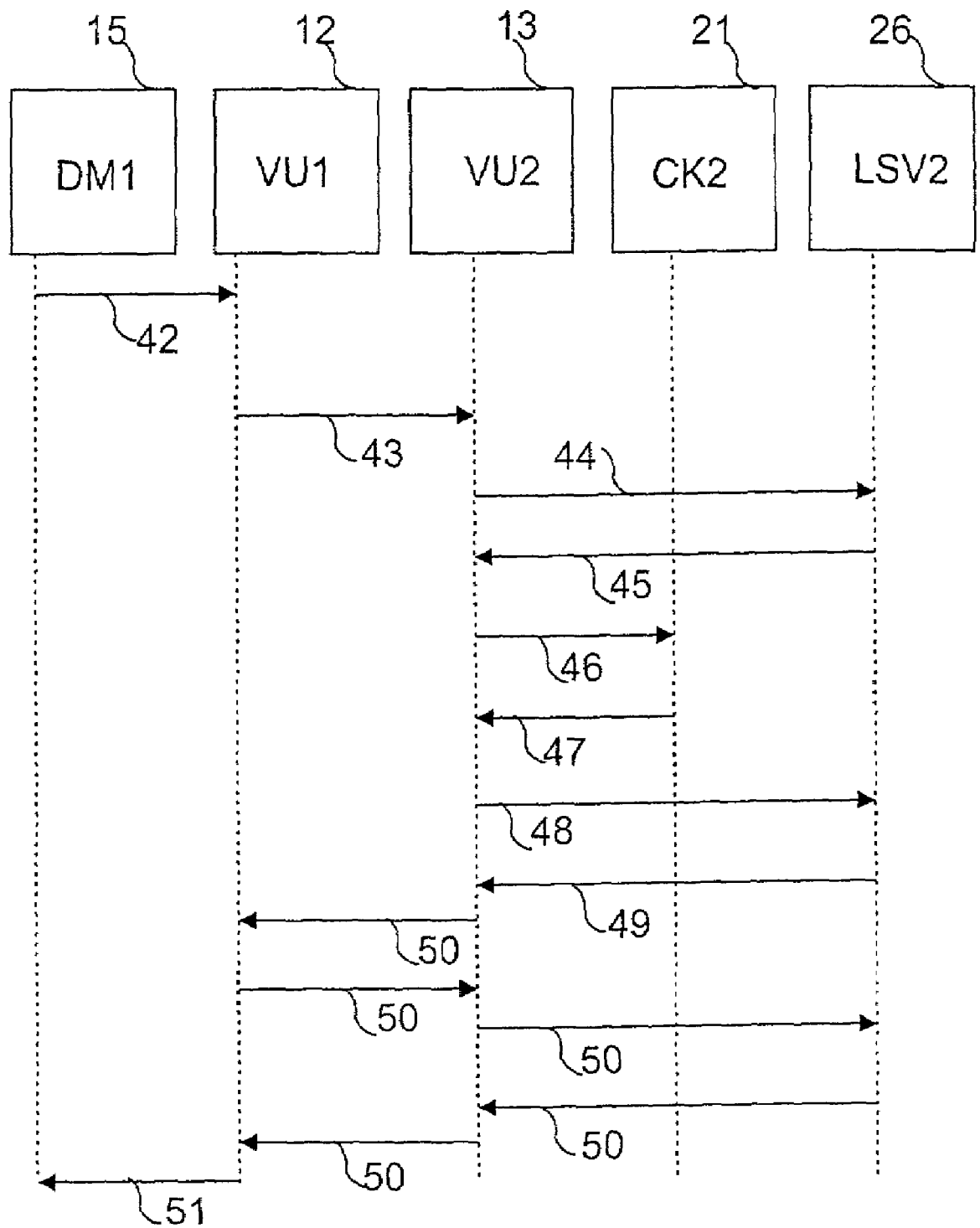
FIG. 6 is a signal flow chart representing the time sequence of actions during a write operation.

FIG. 6 illustrates the time sequence of the actions during a write operation. A user starts the application 30 with the intention to write data and store said data in the network system-wide. The application 30 submits this write instruction to the appropriate data manager (DM1) 15 of the local network node 1, where the user has started the application 30. The data manager 15 again derives the VU key 33 and the DM key 34 from this instruction and applies these together with the new value of the element 28 in a request 42 to the distribution utility (VU1) 12 of the local network node 1. With the aid of the VU key 33 this distribution utility 12 locates the distribution utility (VU2) 13 of the remote network node 2 (or of a plurality of network nodes) where the data are stored and should consequently be changed. By means of a method call 43 the distribution utility 12 requests the distribution utility 13 of the remote network node 2 to change the data object 29.

By means of a request 44 the distribution utility 13 requests the data object 29 associated with the VU key 33 from the local memory manager (LSV2) 26 of the network node 2. In a manner similar to that during a read operation the local memory manager 26 sends the required data object 29, which has been retrieved from the data base 31, to the distribution utility 13 as a reply 45. The distribution utility 13 submits to the callback component (CK2) 21 of the data manager 12 a request 46 to overwrite the element 28 specified by the DM key 34 with the transmitted value. The callback component 21 returns the data object 29 thus changed to the distribution utility 13 with a callback 47, in which a request 48 to prepare for a write operation involving the data object 29 is addressed to the local data manager 26. By means of a callback 49 the local memory manager 26 acknowledges its readiness to write. Subsequently, the distribution utilities 12 and 13 execute, for example, the second part of a 2-phase commit protocol 50, in which the distribution utility 13 indicates the readiness to write to the distribution utilities 12 and in the course of which the memory manager (LSV2) 26 is requested to actually carry out the write operation. The data manager 15 receives an acknowledgement of the successful completion of the write operation by means of the callback 51.

What is claimed is:

1. A network having network nodes (1 to 5) and a software system distributed among all the network nodes (1 to 5), said software system having at each network node (1 to 5) a software component referred to as a distribution utility (12 to 14) for the access to the data of a distributed data base (31), and for the communication with other distribution utilities (12 to 14) of different network nodes, and having at least one software component referred to as a data manager (15 to 19), which serves as a link from the data base (31) to other components and which includes a callback component (20 to 24) for the access to at least one element (28) of a data object (29), and having a key consisting of two parts, of which a first part is a distribution utility key (33) for the identification of a data object (29) by the distribution utility (12 to 14), and of which a second part is a data manager key (34) for the identification of at least one required element (28) of a data object (29), wherein with the aid of the callback component (20 to 24) the distribution utility (12 to 14) employs the data manager (15 to 19) for the interpretation of the data intended for the distribution utility (12 to 14), the data manager (15 to 19) serves for the generation and evaluation of the data manager key (34), and the syntax and content of the data manager key (34) can be selected freely, and wherein the distribution utility (12 to 14) serves for the re-integration of a network node (1 to 5) that has failed and for the integration of a new network node (1 to 5) to be added to the network, and the distribution utility (12 to 14) serves for the use of services made available to said utility by the data manager (15 to 19).

2. A network as claimed in claim 1, wherein a local memory manager (26 to 27) receives a request to change its data base (31) from the distribution utility (12 to 14) of the same network node (1 to 5).

\* \* \* \* \*